Oct. 11, 1966 K. A. BOYD 3,278,240
BRAKE APPORTIONING DEVICE
Filed April 7, 1965 2 Sheets-Sheet 1

INVENTOR.
KEITH A. BOYD
BY
Hoffmann and Yount
ATTORNEYS

INVENTOR.
KEITH A. BOYD
BY Hoffmann and Yount
ATTORNEYS

United States Patent Office 3,278,240
Patented Oct. 11, 1966

3,278,240
BRAKE APPORTIONING DEVICE
Keith A. Boyd, Mount Clemens, Mich., assignor to Eaton Yale & Towne Inc., a corporation of Ohio
Filed Apr. 7, 1965, Ser. No. 446,325
15 Claims. (Cl. 303—6)

The present invention relates to a brake mechanism for use in automotive vehicles and the like and, particularly, to a hydraulic brake system having separate master cylinders connected with independent sets of brakes.

The principal object of the present invention is the provision of a new and improved brake mechanism for use in an automotive vehicle and which compensates for shifting in the weight of the vehicle during braking thereof to reduce the probability of rear wheel lock-up and increase vehicle stability during braking with the resultant safety which is achieved thereby.

Another object of the present invention is the provision of a new and improved brake mechanism for use in an automotive vehicle to apply a greater braking force to the front wheels of the vehicle than to the rear wheels of the vehicle and thereby compensate for shifting of the weight of the vehicle to the front wheels during braking.

A further object of the present invention is the provision of a new and improved hydraulic brake mechanism having plural master brake cylinder mechanisms wherein the piston rods of the brake cylinder mechanism are in an engaging relation with a crossbar member which is connected at a fixed location with a brake-pedal actuated member and wherein one of the brake cylinder mechanisms is movable relative to the other and relative to the crossbar so that the location of engagement of the piston rod of the one brake cylinder mechanism with the crossbar moves toward and away from the fixed location at which the brake-pedal actuated member is connected to the crossbar.

A still further object of the present invention is the provision of a new and improved brake mechanism, as noted in the next preceding paragraph, wherein the cylinder members of the brake master cylinder mechanisms are supported in a parallel relation and the movable cylinder is pivotable relative to the other.

Another object of the present invention is the provision of a new and improved brake cylinder mechanism which includes a pair of brake master cylinder mechanisms, each of which includes a cylinder and a piston movable in the cylinder and a piston rod connected with the piston, and wherein the respective pistons move in unison until a slight pressure is built up in one of the cylinders and the one cylinder then pivots relative to the other cylinder whereby further application of braking force causes a different pressure to be applied in the fluid lines connected with the two cylinder mechanisms.

Still another object of the present invention is the provision of a new and improved brake mechanism, as noted in the next preceding paragraph, wherein the moments of force about the fixed location at which the brake-pedal actuated member engages the crossbar which engages each piston rod are maintained substantially equal, thus rendering the pressure greatest in the cylinder whose piston rod has the shortest moment arm, as measured from the fixed location, and the pressure in the cylinder whose piston rod has the longest moment arm, as measured from the fixed location, proportionately lower.

Yet another object of one form of the present invention is the provision of a new and improved brake mechanism, as noted in the next preceding paragraph, wherein the cylinders are supported for pivotal movement about a pivot point located intermediate the cylinders.

An object of another form of the present invention is the provision of a new and improved brake mechanism having plural master cylinders, one of which is pivoted relative to the other about a pivot point offset from the center of the bore of the one cylinder to the side of the one cylinder away from the other cylinder member.

Further objects and advantages of the present invention will be apparent to those skilled in the art to which it relates from the following detailed description of the preferred embodiment thereof made with reference to the accompanying drawings forming a part of this specification and in which.

Figure 1:
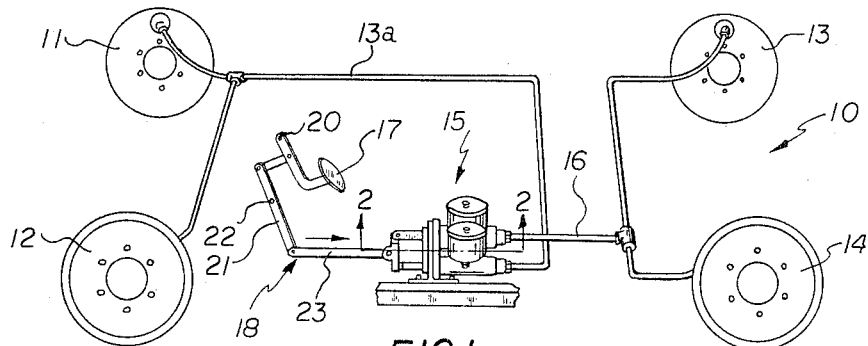
FIG. 1 is a schematic perspective view of a brake system embodying the present invention.
Figure 2:
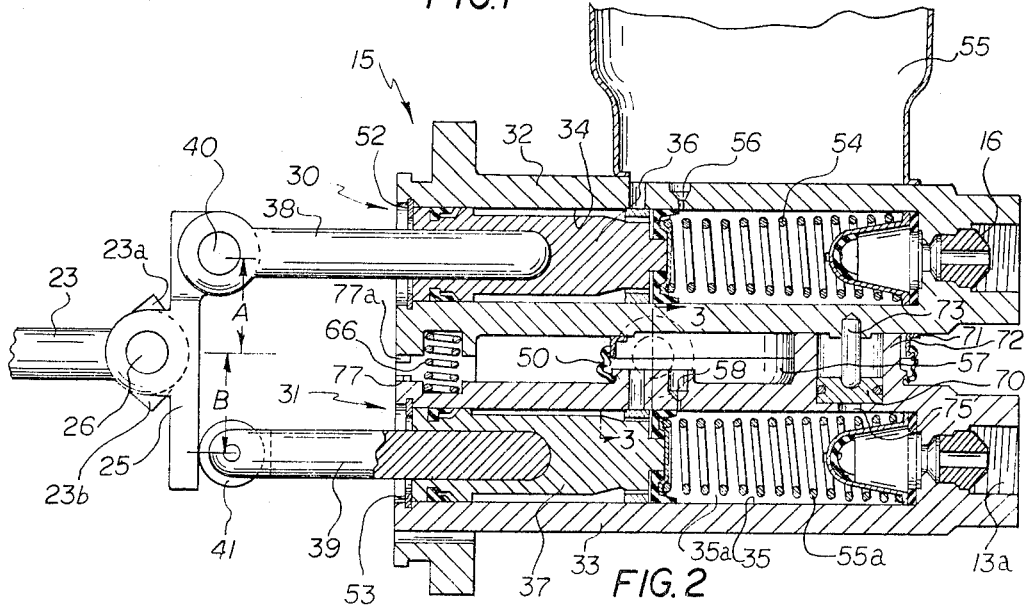
FIG. 2 is a cross-sectional view of the system shown in FIG. 1, taken approximately along the section line 2—2 of FIG. 1.
Figure 3:
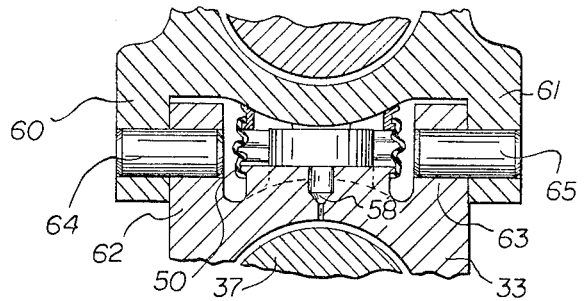
FIG. 3 is a cross-sectional view of the mechanism shown in FIG. 2, taken approximately along the section line 3—3 of FIG. 1.
Figure 7:
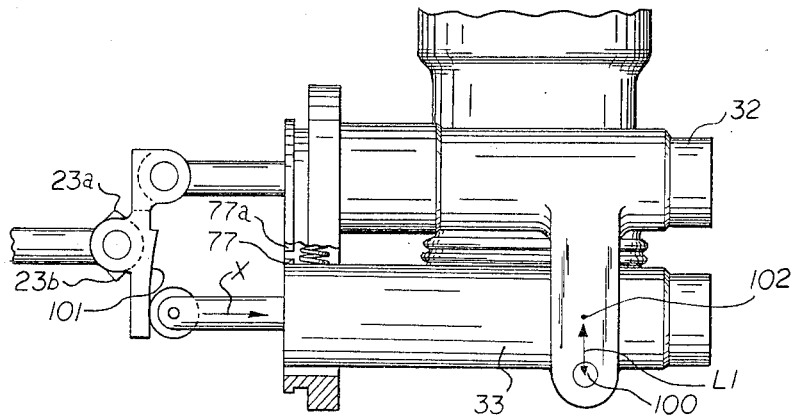
Figure 4:
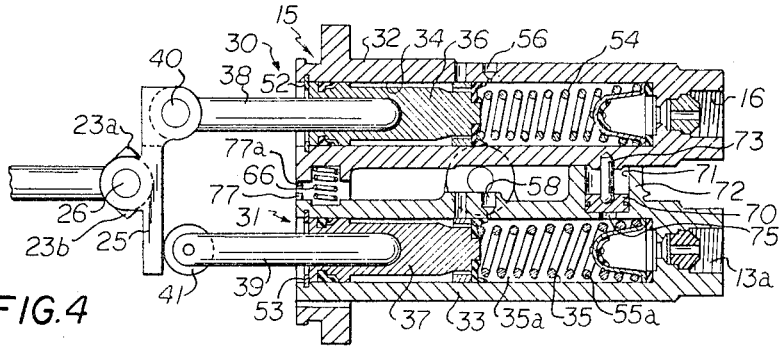
Figure 5:
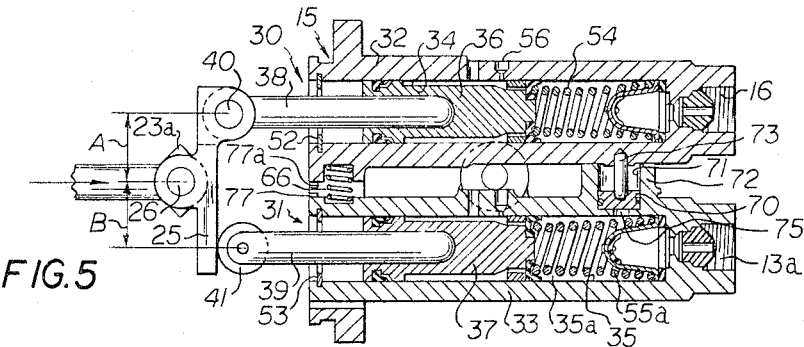
Figure 6:
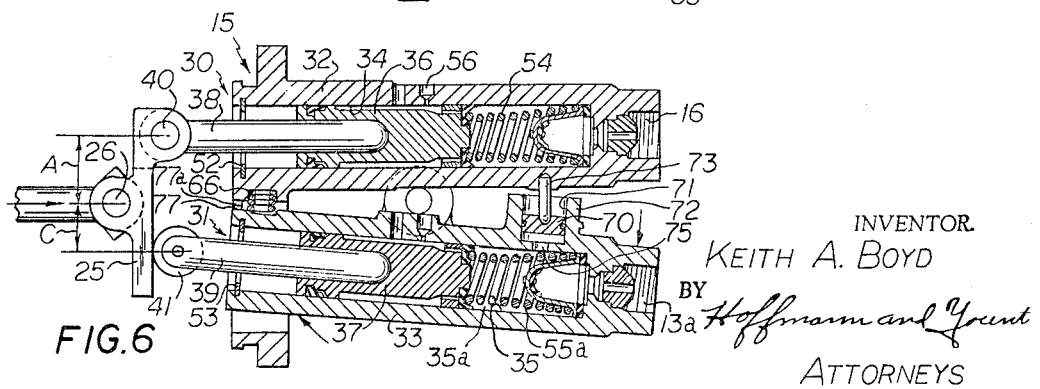

FIGS. 4, 5, and 6 are schematic views illustrating various operative positions of the brake mechanism of FIG. 2; and FIG. 7 is a modified form of brake mechanism usable in the brake system of FIG. 1.

The present invention provides an improved brake mechanism for use in a hydraulic brake system in an automotive vehicle, or the like. The brake mechanism is constructed so as to compensate for the shifting of the weight of the vehicle during the braking thereof. In the braking of an automotive vehicle, generally the weight of the vehicle shifts forwardly causing the front end of the vehicle to move or dip downwardly. This tendency of the weight of the vehicle to shift results, at times, in rear wheel lock-up which becomes a safety hazard affecting the operator's control of the vehicle. The brake mechanism of the present invention operates to compensate for the shifting of the weight of the vehicle during the braking of the vehicle by increasing the braking effect on the wheels to which the weight is being shifted and reducing the braking effect on the wheels from which the weight is being shifted. Specifically, the present brake mechanism applies a greater braking force to the front wheels of the vehicle than the rear wheels to minimize rear wheel lock-up. The ratio of the brake force applied to the front wheels as compared to that brake force on the back wheels increases as the brake effort increases, as will be apparent from the description hereinbelow.

As representing a preferred embodiment of the present invention, the drawings illustrate in FIG. 1 a hydraulic brake system, generally designated 10. The hydraulic brake system 10 is used in an automotive vehicle and includes front wheel brakes 11 and 12 and rear wheel brakes 13 and 14. In the system illustrated in FIG. 1, the front wheel brakes 11 and 12 are connected with a fluid or hydraulic line 13a which, in turn, is connected to a brake mechanism generally designated 15. The rear wheel brakes 13 and 14 are connected with a hydraulic pressure line 16 which also is connected with the brake mechanism 15.

The brake mechanism 15 is operative to apply hydraulic fluid pressure to the front and rear wheel brakes through the lines 13a and 16, respectively. The brake mechanism 15 is operated to apply hydraulic pressure to the front and rear wheel brakes upon depression of the brake pedal 17 of the automotive vehicle. The brake pedal 17 of the automotive vehicle is connected with a suitable linkage 18 which interconnects the brake pedal 17 and the brake mechanism 15 to operate the brake mechanism 15 upon depression of the brake pedal 17.

The brake pedal 17, when depressed, pivots about pivot point 20 downwardly causing pivoting movement of the link 21 of the linkage 18 about pivot point 22. Pivoting movement of the link 21 about pivot point 22 in a counterclockwise direction causes movement of the brake pedal actuated link member 23 toward the right, as viewed in FIG. 1. The brake pedal actuated link member 23 carries on the outer end thereof a crossbar member 25 pivotally conected thereto at 26. The particular construction of the linkage 18 and mounting of the brake pedal 17, described above, does not form part of the present invention and any particular construction may be used.

The crossbar member 25 is operatively associated with the brake mechanism 15 to effect operation of the brake mechanism 15. The brake mechanism 15 includes a pair of brake master cylinder mechanisms 30 and 31. The brake master cylinder mechanisms 30, 31 include cylinder members 32, 33, respectively, having bores 34, 35, respectively, therein. The brake master cylinder mechanisms 30, 31 also include piston members 36, 37, respectively, operatively connected with piston rods 38, 39, respectively. The outermost end portion of the piston rod 38 is connected at one end of the crossbar 25 by means of a pivot pin 40 providing an engagement between the piston rod 38 and the crossbar 25, located at a fixed distance, designated A, from the connection 26 of the link member 23 to the crossbar 25. The outermost end of the piston rod 39 preferably carries a roller member 41 which engages the crossbar 25 and is movable relative thereto, as will be described hereinbelow. In the position shown in FIG. 2, the engagement of the roller member 41 with the crossbar is located at a distance B from the point of engagement of the link 23 with the crossbar 25, as shown in FIG. 2, and the distances A, B are substantially identical.

The piston members 36 and 37 are biased toward the left, as viewed in FIG. 2, to a rear or retracted position in engagement with suitable stops 52, 53, respectively, by means of springs 54, 55a, respectively. The springs 54, 55a act between the outermost end of the bore in which they are located and the piston members, holding the piston members against the stops 52 and 53. The piston members move in the bores against the bias of the springs 54, 55a when the link 23 moves toward the right, as viewed in FIG. 2. The particular construction of these springs and the mounting thereof are well known and will not be described.

The brake cylinder mechanisms 30 and 31 are preferably associated witht hydraulic fluid reservoirs 55 and 55a for supplying brake fluid to the cylinder mechanisms 30, 31. However, a single reservoir may be used. The reservoir 55 is connected with the bore 34 of the cylinder 32 by means of an opening or passageway 56 forwardly of the piston member 36 when its rear position, as shown in FIG. 2. The reservoir 55a is connected with the bore 35 of the cylinder 33 by a passageway 58 in the cylinder member 33 forwardly of the piston member 37 when in its rear position. A suitable boot member 50 extends between the cylinder members 32 and 33 and provides a fluid-tight connection therebetween so that fluid does not leak therebetween. Suitable seals are provided on the piston members to prevent leakage of fluid between the periphery thereof and the bore of the cylinder.

From the above description, it should be apparent that upon depressing of the brake pedal 17 of the automotive vehicle, the link member 23 moves to the right forcing the piston members 36, 37 to the right. Movement of the piston members 36, 37 to the right causes fluid pressure build-up in the cylinder bores 34, 35 and the fluid lines 16, 13a, respectively, causing actuation of the brake mechanisms 11, 12, 13, and 14. The link member 23 is provided with stops 23a and 23b to engage opposite portions of the crassbar 25 in the event that the crossbar pivots about the pivot pin 26. The crossbar 25 will pivot about the pivot pin 26 in the event of a loss in hydraulic pressure on one of the cylinders. These stops thus function as a safety feature.

As noted hereinabove, the brake mechanism 15 is constructed so as to compensate for shifting of the weight of the vehicle when the brakes thereof are applied. This compensation is provided by applying a greater braking force to the front brakes 11, 12 of the vehicle than is applied to the rear wheel brakes 13, 14. To accomplish this end, the brake cylinder 33 which is connected with the hydraulic conduit 13a leading to the front wheels of the vehicle is supported for movement relative to the cylinder 32 and relative to the crossbar 25, so that the location of the engagement between the outer end of the piston rod 39 with the crossbar 25 moves toward the location where the link 23 engages the cross bar, which is the location where the force which causes actuation of the mechanism 15 is applied to the crossbar.

Specifically, the cylinder 33 is supported for pivotal movement relative to the cylinder 32 about an axis located intermediate the cylinder members. The cylinder 32 is provided with spaced lug members 60 and 61 on the opposite sides thereof and the cylinder member 33 is provided with similar lug members 62 and 63 which are adapted to be positioned adjacent to the lug members 60 and 61, and which have aligned openings therethrough. A suitable pivot pin member 64 extends through aligned openings in the lug members 60, 62 and a similar pivot pin member 65 extends through aligned openings in the lug members 61, 63. The cylinder 33 may pivot about the axis provided by the pin members 64 and 65. The pivoting motion is effected against the bias of a spring 66 positioned between the forward ends of the cylinder members 32, 33 and located in suitable recesses therein biasing the cylinder members apart and to the position shown in FIG. 2 wherein the cylinder members have a substantially parallel disposition. Movement of the cylinder member 33 about the axis provided by the pins 64, 65 is against the bias of the spring 66 and, of course, results in the cylinder 33 being angularly disposed relative to the cylinder 32.

Movement of the cylinder member 33 about the axis of the pins 64, 65 against the bias of the spring 66 is effected by an increase in pressure in the bore 35 forwardly of the piston member 37. This increase in pressure is effected by movement of the piston members from the position shown in FIG. 4 to the position shown in FIG. 5. This increase in pressure acts against a piston member 70 located in a bore 71 formed in a boss 72 of the cylinder 33. The piston member 70 is supported in the bore by a piston rod 73 which is fixedly connected with the cylinder 32. The piston member 70, therefore, does not move, however, it does move relative to the bore 71 in which it is located. The lower face of the piston member 70 is in communication with the bore 35 through a passageway 75. As pressure increases in the bore 35, this pressure acts on the lower face of the piston 70 and causes pivoting movement of the cylinder 33 about the axis of the pins 64, 65. The pivoting motion is limited, however, by engagement of a stop portion 77 of the cylinder 33 with a stop portion 77a of the cylinder 32. The pivoting movement of the cylinder 33 is against the spring 66 and the degree of movement of the cylinder 33 depends upon the pressure acting on the piston 70. Therefore, as the pressure in the bore 35 varies, which is a function of the force applied to the rod 23, the cylinder member 33 pivots.

As a result of the above-described pivoting movement, the piston rod 39 moves relative to the crossbar 25 an extent depending upon the braking force. As shown in FIG. 6, by way of example, the location of the engagement of the piston rod 39 with the crossbar has moved toward the link 23 and is located a distance C from the location of engagement of the link 23 with the crossbar 25. When the cylinder 33 has pivoted, the pressure exerted on the pedal 17 is transmitted to the piston rods 39, 38 in proportion to the lengths of their moment arms, and in FIG. 6 in proportion to the lengths A and C, so that the moments of force about the effective point at which the force is applied to the crossbar 25 by the link 23 are equal. Thus, it can be seen that the force applied to the piston rod 39 will be greater than the force applied to the piston rod 38 in view of the fact that the moment arm C is smaller than the moment arm A. Moreover, it should be apparent that as the braking force increases, the moment arm decreases to a minimum.

The limit of pivoting movement of the cylinder 33 may vary depending upon the dynamic characteristics of the vehicle in which the braking mechanism is used. For example, if at a deceleration rate of 32 ft./sec.$^2$, the front wheel weight is twice the rear wheel weight and the wheel cylinders and brake cylinders are all the same diameter, then the distance C would be one-half the distance A so that the front wheels would receive twice the braking force as the rear wheels. On the other hand, if the dynamic characteristics of the vehicle were such that at a deceleration rate of 32 ft./sec.$^2$ the front wheel weight was 1½ times the rear wheel weight and with the cylinders all of the same diameter, then the distance C would be equal to two-thirds the distance A and the braking force applied to the front wheels would be 1½ times the braking force applied to the rear wheels.

In the embodiment shown in FIG. 6, the moment arm C is one-half the moment arm A and as a result, the pressure applied to the conduit 13a is approximately twice that of the pressure in the conduit 58. As a result, the force applied to the front wheels of the vehicle is approximately twice that of the braking force applied to the rear wheels of the vehicle, when the brakes are applied to a degree sufficient to provide the proper braking pressure to brake the vehicle at a deceleration rate of 32 ft./sec.$^2$.

A modified embodiment of the present invention is illustrated in FIG. 7. The embodiment shown in FIG. 7 differs from that described above in the manner of effecting the pivotal movement of the cylinder 33. In FIG. 7, the pivot point 100 about which the lower cylinder member 33, as shown in FIG. 7, pivots, is located beneath the cylinder member 33 and remotely from the cylinder member 32. The pivoting of the cylinder member 33 relative to the cylinder member 32 about the axis 100 is effected by the crossbar reaction torque which provides a force which tends to rotate the cylinder member 33 in a clockwise direction about the axis 100.

The pivoting movement of the cylinder 33 in the embodiment shown in FIG. 4 is effective as is the cross piston mechanism embodied in the modification shown in FIG. 1, and pivoting movement is effected against the bias of a spring 66. The amount of pivoting movement of the cylinder 33 will depend, of course, upon the pressure in the cylinder 33 and this mechanism operates in the same manner as in the modification shown in FIG. 1 described hereinabove. The forces tending to rotate the cylinder member 33 about the pivot axis 100 comprise the force applied by the crossbar 25 and designated X in FIG. 7 and which acts axially of the cylinder member 33. This force acts at a moment arm designated L1 on FIG. 7 and is resisted by the action of the spring 66, as noted hereinabove. The crossbar 25 in the embodiment shown in FIG. 7 has an arcuate surface 101 which engages the piston rod 39. The center of this arcuate surface is located immediately above the axis 100 and in the center of the cylinder 33 and at a point designated 102 in FIG. 7 through which the force X acts. The arcuate surface 101 is effective to maintain the moment arm L1 constant regardless of the pivoting position of the cylinder 33 so that the moment arm of the forces tending to pivot the cylinder 33 remains constant. The operation of the modification shown in FIG. 7 is as described hereinabove in connection with the modification shown in FIG. 1 and in view of the fact that these modifications operate in a similar manner, the operation of the modification shown in FIG. 7 will not be described. It should be apparent, however, that the modification shown in FIG. 7 is simpler in that it does away with the need of the cross piston for effecting the pivoting movement of the cylinder 33.

From the above description, it should be apparent that applicant has provided a new and improved brake mechanism and that certain modifications, changes, and adaptations therein may be made by those skilled in the art to which it relates and it is intended hereby to cover all such changes, modifications, and adaptations coming within the scope of the appended claims.

Having described my invention, I claim:

1. A brake mechanism for a hydraulic brake system having fluid lines connected with independent brakes comprising a pair of brake master cylinder mechanisms, each of said brake master cylinder mechanisms adapted to actuate a respective one of said brakes, each of said brake master cylinder mechanisms comprising a cylinder member having a bore therein and a piston member movable in the bore and a piston rod connected with the piston member and extending outwardly of the bore, a crossbar member engaging the ends of the piston rods opposite the ends connected with the piston members, a brake-pedal actuated member connected with the crossbar member at a fixed location intermediate the engagements of the crossbar to the piston rods to apply a braking force thereto at a fixed location, means supporting one of said brake cylinder mechanisms for movement relative to the other brake cylinder mechanism and relative to said crossbar so that the location of engagement of the piston rod of said one brake cylinder mechanism with said crossbar moves toward and from said fixed location.

2. A brake mechanism for a hydraulic brake system having fluid lines connected with independent sets of brakes comprising a pair of brake master cylinder mechanisms, each of said brake master cylinder mechanisms adapted to actuate a respective one of said brake sets, each of said brake master cylinder mechanisms comprising a cylinder member having a bore connected with a supply of fluid and a piston member movable in the bore to increase the pressure of the fluid therein and a piston rod connected with the piston member and extending outwardly of the bore, a crossbar member engaging the ends of the piston rods opposite the ends connected with the piston members, a brake-pedal actuated member connected with the crossbar member at a fixed location intermediate the engagements of the crossbar to the piston rods to apply a braking force thereto at a fixed location, means supporting one of said brake cylinder mechanisms for movement relative to the other brake cylinder mechanism and relative to said crossbar so that the location of engagement of the piston rod of said one brake cylinder mechanism with said crossbar moves toward and from said fixed location whereby the force transmitted by said one brake cylinder mechanism to the set of brakes with which it is connected is greater than the force transmitted by the other brake cylinder mechanism.

3. A brake mechanism for a hydraulic brake system having fluid lines connected with independent sets of brakes comprising a pair of brake master cylinder mechanisms, each of said brake master cylinder mechanisms adapted to actuate a respective one of said brake sets, each of said brake master cylinder mechanisms comprising a cylinder member having a bore connected with a supply of fluid and a piston member movable in the bore to increase the pressure of the fluid therein and a piston rod connected with the piston member and extending outwardly of the bore, a crossbar member engaging the ends of said piston rods opposite the ends connected with the piston members, a brake pedal actuated member connected with the crossbar member at a fixed location intermediate the engagements of the crossbar and the piston rods to apply a braking force thereto at a fixed location, means supporting one of said brake cylinder mechanisms for pivotal movement relative to the other brake cylinder mechanism and relative to said crossbar so that the location of engagement of the piston rod of said one brake cylinder mechanism with said crossbar moves toward and away from said fixed location.

4. A brake mechanism for a hydraulic system having fluid lines connected with independent sets of brakes comprising a pair of brake master cylinder mechanisms, each of said brake master cylinder mechanisms adapted to actuate a respective one of said brake sets, each of said brake master cylinder mechanisms comprising a cylinder member having a bore connected with a supply of fluid and a piston member movable in the bore to increase the pressure of the fluid therein and a piston rod connected with the piston member and extending outwardly of the bore, a crossbar member engaging the ends of the piston rods opposite the ends connected with the piston members, a brake pedal actuated member connected with the crossbar member at a fixed location intermediate the engagements of the crossbar to the piston rods to apply a braking force thereto at a fixed location, means supporting one of said brake cylinder mechanisms for pivotal movement relative to the other brake cylinder mechanisms to effect movement of the location of engagement of the piston rod of said one brake cylinder mechanisms with said crossbar toward and away from said fixed location, and means responsive to the fluid pressure in the cylinder member of said one brake cylinder mechanism for effecting said pivotal movement.

5. A brake mechanisms as defined in claim 4 wherein said means supporting said brake cylinder for pivotal movement comprises a pivot pin means extending through a portion of said one brake cylinder through a portion of said other brake cylinder and is located intermediate said cylinder members.

6. A brake cylinder mechanism as defined in claim 4 wherein the moments of force about said fixed location are equal so that the one brake cylinder mechanism when pivoted so as to move the point of engagement of the piston rod thereof with the crossbar toward said fixed location effects a shortening of the moment arm with respect thereto.

7. A brake mechanism for a hydraulic brake system having fluid lines connected with independent sets of brakes comprising a pair of brake master cylinder mechanisms, each of said brake master cylinder mechanisms adapted to actuate a respective one of said brake sets, each of said brake master cylinder mechanisms comprising a cylinder member having a bore connected with a supply of fluid and a piston member movable in the bore and a piston rod connected with the piston member and extending outwardly of the bore, a crossbar member engaging the ends of the piston rods opposite the ends connected to the piston members, a brake pedal actuated member connected with the crossbar member at a fixed location intermediate the engagements of the crossbar to the piston rods to apply a braking force thereto at a fixed location, means supporting one of said brake cylinder mechanisms for pivotal movement relative to the other brake cylinder mechanism and relative to said crossbar from a first position wherein the cylinder members of said brake master cylinder mechanisms have a parallel disposition to a second position wherein the cylinder members are angularly related so that the location of engagement of the piston rod of the one brake cylinder mechanism with the crossbar is movable toward and away from the fixed location, means biasing said cylinder members into their said first position, and means for effecting movement thereof to their said second position.

8. A brake mechanism as defined in claim 7 further including means responsive to the fluid pressure in the cylinder member of said one piston member to effect pivoting movement thereof.

9. A brake mechanism as defined in claim 8 wherein said means responsive to the fluid pressure comprises a piston member fixedly connected with the other cylinder member and located in a bore extending angularly to the bore in which the piston member of the one brake master cylinder mechanism is located and communicating therewith.

10. A brake mechanism as defined in claim 7 wherein said cylinder members communicate with a fluid reservoir means and are connected therewith to allow for movement of said one cylinder member relative thereto.

11. A brake mechanism as defined in claim 7 wherein said one brake cylinder mechanism is pivotal relative to the other about an axis intermediate the cylinder members thereof.

12. A brake mechanism as defined in claim 7 wherein said one brake master cylinder mechanism is pivotal relative to the other about an axis offset to the side thereof diametrically opposite the side thereof on which the other cylinder member is located.

13. A mechanism comprising a pair of force transmitting mechanisms, each of said force transmitting mechanisms comprising a cylinder member having a bore therein and a piston member movable in the bore and a piston rod connected with the piston member and extending outwardly of the bore, a crossbar member engaging the ends of said piston rods opposite the ends connected with the piston members, an actuating member connected with the crossbar member at a fixed location intermediate the engagements of the crossbar and the piston rods to apply a force thereto at a fixed location, means supporting one of said force transmitting mechanisms for pivotal movement relative to the other force transmitting mechanism and relative to said crossbar so that the location of engagement of the piston rod of said one cylinder mechanism with said crossbar moves toward and away from said fixed location.

14. A mechanism comprising a pair of force transmitting mechanisms, each of said force transmitting mechanisms comprising a cylinder member having a bore connected with a supply of fluid and a piston member movable in the bore to increase the pressure of the fluid therein and a piston rod connected to the piston member and extending outwardly of the bore, a crossbar member engaging the ends of the piston rods opposite the ends connected to the piston members, an actuating member connected with the crossbar member at a fixed location intermediate the engagements of the crossbar to the piston rods to apply a force thereto at a fixed location, means supporting one of said force transmitting mechanisms for pivotal movement relative to the other force transmitting mechanism to effect movement of the location of engagement of the piston rod of said one force transmitting mechanism with said crossbar toward and away from said fixed location, and means responsive to the fluid pressure in the cylinder member of said one force transmitting mechanism for effecting said pivotal movement.

15. A mechanism comprising a pair of force transmitting mechanisms, each of said force transmitting mechanisms comprising a cylinder member having a bore therein connected with a supply of fluid and a piston member movable in the bore to increase the pressure of the fluid therein and a piston rod connected with the piston member and extending outwardly of the bore, a crossbar member engaging the ends of the piston rods opposite the ends connected with the piston members, an actuating member connected with the crossbar member at a fixed location intermediate the engagements of the crossbar to the piston rods to apply a force thereto at a fixed location, means supporting one of said force transmitting mechanisms for pivotal movement relative to the other force transmitting mechanism and relative to said crossbar from a first position wherein the cylinder members thereof have a parallel disposition to a second position wherein the cylinder members thereof are angularly related so that the location of engagement of the piston rod of the one brake cylinder mechanism with the crossbar moves toward and away from the fixed location, means biasing the cylinder member of said one force transmitting mechanism to said first position in parallel disposition with the other, and means for effecting movement thereof to said second position against said bias.

References Cited by the Examiner

UNITED STATES PATENTS

| | | |
|---|---|---|
| 1,457,156 | 5/1923 | Frock. |
| 1,822,900 | 9/1931 | Messier. |
| 2,754,938 | 7/1956 | Gallay _____ 60—54.6 X |

MILTON BUCHLER, *Primary Examiner.*

G. E. A. HALVOSA, *Assistant Examiner.*